United States Patent
Pitroda

(10) Patent No.: US 8,527,380 B2
(45) Date of Patent: Sep. 3, 2013

(54) SYSTEM AND METHODS FOR SERVICING ELECTRONIC TRANSACTIONS

(75) Inventor: Satyan G. Pitroda, Oakbrook Terrace, IL (US)

(73) Assignee: C-SAM, Inc., Oakbrook Terrace, IL (US)

( * ) Notice: Subject to any disclaimer, the term of this patent is extended or adjusted under 35 U.S.C. 154(b) by 2655 days.

(21) Appl. No.: 10/284,676

(22) Filed: Oct. 31, 2002

(65) Prior Publication Data

US 2003/0115126 A1 Jun. 19, 2003

Related U.S. Application Data

(62) Division of application No. 09/372,365, filed on Aug. 11, 1999, now Pat. No. 7,308,426.

(51) Int. Cl.
*G06Q 30/00* (2012.01)

(52) U.S. Cl.
USPC ............... 705/35; 705/14; 705/17; 705/36 R; 705/39; 705/40; 705/41; 235/379; 235/380

(58) Field of Classification Search
USPC ................ 705/14, 26, 27, 39, 40, 41, 17, 28, 705/67, 35, 36; 455/405, 406; 235/379, 235/380, 383, 384, 492
See application file for complete search history.

(56) References Cited

U.S. PATENT DOCUMENTS

| | | |
|---|---|---|
| RE28,081 E | 7/1974 | Travioli |
| 4,305,059 A | 12/1981 | Benton |
| 4,341,951 A | 7/1982 | Benton |
| 4,454,414 A | 6/1984 | Benton |
| 4,491,725 A | 1/1985 | Prichard |
| 4,523,087 A | 6/1985 | Benton |
| 4,575,621 A | 3/1986 | Dreifus |

(Continued)

FOREIGN PATENT DOCUMENTS

| | | |
|---|---|---|
| EP | 0950968 | 10/1999 |
| GB | 2255934 | 11/1992 |

(Continued)

OTHER PUBLICATIONS

Sprint Priority Gold[SM] Newsletter, Mar. 11, 1994,—"the Voice FONCARD[SM]" 1994 Sprint Communications Co. L.P. (2 pgs).

(Continued)

*Primary Examiner* — Nga B. Nguyen
(74) *Attorney, Agent, or Firm* — Husch Blackwell LLP

(57) ABSTRACT

A method for using an electronic transaction device with an electronic transaction service provider may include the steps of registering the electronic transaction device with the electronic transaction device service provider, registering a plurality of accounts corresponding to a plurality of service institutions, providing a data connection between the electronic transaction device and the electronic transaction device service provider, and storing account information for a plurality of service institutions at the electronic transaction device service provider. The method may also include the steps of providing access to a database of client information to the client and analyzing transactional information in the database of client information for a plurality of accounts. The method may also include the steps of designating a portion of the client database non-confidential; analyzing the portion of the client database designated as non-confidential for preferences and patterns; and providing analyzed transactional information to a plurality of vendors.

13 Claims, 11 Drawing Sheets

(56) References Cited

U.S. PATENT DOCUMENTS

| | | | |
|---|---|---|---|
| 4,634,845 A | 1/1987 | Hale et al. | |
| 4,650,981 A | 3/1987 | Foletta | |
| 4,689,478 A | 8/1987 | Hale et al. | |
| 4,692,601 A | 9/1987 | Nakano | |
| 4,705,211 A | 11/1987 | Honda et al. | |
| 4,739,295 A | 4/1988 | Hayashi et al. | |
| 4,799,156 A | 1/1989 | Shavit et al. | |
| 4,833,595 A | 5/1989 | Iijima | |
| 4,837,422 A | 6/1989 | Dethloff et al. | |
| 4,849,613 A | 7/1989 | Eisele | |
| 4,849,614 A | 7/1989 | Watanabe et al. | |
| 4,858,121 A | 8/1989 | Barber et al. | |
| 4,891,506 A | 1/1990 | Yoshimatsu | |
| 4,910,774 A | 3/1990 | Barakat | |
| 4,910,775 A | 3/1990 | Yves et al. | |
| 4,918,631 A | 4/1990 | Hara et al. | |
| 4,928,001 A | 5/1990 | Masada | |
| 4,973,828 A | 11/1990 | Naruse et al. | |
| 4,983,816 A | 1/1991 | Iijima | |
| 5,015,830 A | 5/1991 | Masuzawa et al. | |
| 5,017,766 A | 5/1991 | Tamada et al. | |
| 5,023,908 A | 6/1991 | Weiss | |
| 5,055,662 A | 10/1991 | Hasegawa | |
| 5,055,968 A | 10/1991 | Nishi et al. | |
| 5,068,521 A | 11/1991 | Yamaguchi | |
| 5,150,420 A | 9/1992 | Haraguchi | |
| 5,153,842 A | 10/1992 | Dlugos, Sr. et al. | |
| 5,157,247 A | 10/1992 | Takahira | |
| 5,168,151 A | 12/1992 | Nara | |
| 5,189,287 A | 2/1993 | Parienti | |
| 5,218,188 A | 6/1993 | Hanson | |
| 5,276,311 A * | 1/1994 | Hennige | 235/380 |
| 5,301,105 A | 4/1994 | Cummings, Jr. | |
| 5,590,038 A | 12/1996 | Pitroda | |
| 5,715,314 A | 2/1998 | Payne et al. | |
| 5,717,923 A | 2/1998 | Dedrick | |
| 5,794,207 A | 8/1998 | Walker et al. | |
| 5,815,665 A | 9/1998 | Teper et al. | |
| 5,842,178 A | 11/1998 | Giovannoli | |
| 5,845,070 A | 12/1998 | Ikudome | |
| 5,852,809 A | 12/1998 | Abel et al. | |
| 5,855,008 A | 12/1998 | Goldhaber et al. | |
| 5,859,419 A * | 1/1999 | Wynn | 235/487 |
| 5,878,141 A | 3/1999 | Daly et al. | |
| 5,884,271 A | 3/1999 | Pitroda | |
| 5,899,980 A | 5/1999 | Wilf et al. | |
| 5,903,721 A | 5/1999 | Sixtus | |
| 5,943,423 A * | 8/1999 | Muftic | 705/67 |
| 5,956,700 A | 9/1999 | Landry | |
| 5,970,475 A | 10/1999 | Barnes et al. | |
| 5,979,757 A * | 11/1999 | Tracy et al. | 235/383 |
| 6,078,907 A | 6/2000 | Lamm | |
| 6,085,976 A * | 7/2000 | Sehr | 235/384 |
| 6,115,709 A | 9/2000 | Gilmour et al. | |
| 6,142,369 A * | 11/2000 | Jonstromer | 235/380 |
| 6,145,739 A | 11/2000 | Bertina et al. | |
| 6,149,055 A * | 11/2000 | Gatto | 235/379 |
| 6,250,557 B1* | 6/2001 | Forslund et al. | 235/492 |
| 6,260,024 B1 | 7/2001 | Shkedy | |
| 6,282,522 B1 | 8/2001 | Davis et al. | |
| 6,418,326 B1 | 7/2002 | Heinonen et al. | |
| 6,442,532 B1* | 8/2002 | Kawan | 705/36 R |
| 6,505,773 B1* | 1/2003 | Palmer et al. | 235/380 |
| 6,574,608 B1 | 6/2003 | Dahod et al. | |
| 6,577,861 B2* | 6/2003 | Ogasawara | 455/419 |
| 6,578,014 B1 | 6/2003 | Murcko, Jr. | |
| 6,622,015 B1* | 9/2003 | Himmel et al. | 455/414.1 |
| 6,714,979 B1 | 3/2004 | Brandt et al. | |
| 6,738,749 B1* | 5/2004 | Chasko | 705/17 |
| 6,885,877 B1 | 4/2005 | Ozaki et al. | |
| 7,158,948 B1* | 1/2007 | Rodriguez et al. | 705/28 |
| 7,167,711 B1* | 1/2007 | Dennis | 455/456.1 |
| 7,200,578 B2* | 4/2007 | Paltenghe et al. | 705/74 |
| 7,216,091 B1* | 5/2007 | Blandina et al. | 705/26 |
| 7,308,426 B1 | 12/2007 | Pitroda | |
| 7,451,114 B1 | 11/2008 | Matsuda et al. | |

FOREIGN PATENT DOCUMENTS

| | | |
|---|---|---|
| JP | 11-017675 | 1/1999 |
| JP | 11-219481 | 8/1999 |
| WO | WO 9703404 | 1/1997 |
| WO | WO99/09502 | 2/1999 |

OTHER PUBLICATIONS

PC Magazine—Mar. 29, 1994, Trends, Trends & Technology Shaping the Personal Computer Market, "The PC in Your Wallet", publication (1 page).

Business Life Magazine, Dec./Jan. 1994/95, "The Era of the Smart Card", publication (4 pages).

Mondex Magazine—The World of Mondex Global Electronic Cash, Summer 1996, "What's up doc?—The smart way to pay for infotainment", publication (3 pages).

"SmartTV tm", Mar. 1, 1997 (four pages plus cover page).

CyberCash Microsoft CPC Wallet, Aug. 3, 1999—"What is the Microsoft Wallet?"—Internet publication (2 pages)—http://www.cybercash.com/ms/coincpc/description.htlm.

Ilium Software's eWallet—"eWallet.TM." All your Important Information Secure, Convenient, Centralized Handheld, Palmsize and Desktop PCs—Jul. 26, 1999, Internet publication (3 pages)—http://vvww.iliumsoft.com/wallet.htm.

Ilium Software's Keep Track for Windows CE—"Keep Track"—Version 2.0: Many New Features Credit, Debit, ATM card transactions—Handheld, Palmsize and Desktop PCs, Jul. 26, 1999 Internet publication (3 pages)—http://www.iliumsoft.com/keeptrk.htm.

Ilium Software: Handheld Software for Windows CE—"Ilium Software—Simple Software for a Simpler Life", Jul. 26, 1999, Internet publication (4 pages)—http://www.iliumsoft.com/about.htm.

Ilium Software Products—Product Information—Jul. 26, 1999, Internet publication (2 pages)—http://www.iliumsoft.com/products.htm.

Q*Wallet—Electronic Wallet for Windows 95/98/NT—"Q*Wallet Home", Jul. 26, 1999, Internet publication (2 pages)—http://www.qwallet.com/index.shtml.

Q*Wallet Screenshots—Electronic Wallet for Windows 95/98/Nt—"Q*Wallet Screenshots", Jul. 26, 1999, Internet publication (3 pages)—http://www.ciwallet.com/screens.shtml.

Welcome to EntryPoint—"Welcome to entrypoint !"—"PointCast +Ewallet = entrypoint.TM.", Sep. 22, 1999, Internet publication (15 pages)—http://www.entrypoint.com/.

Palm Wars—"3COM tries to solve its palm problem"—"The creators of the Palm launch a new device, and 3Com fights back" by Daniel Roth. Fortune, pp. 111-112, Oct. 11, 1999 (2 pgs.).

Nokia—"Next Up for Cell Phones: Weaving a Wireless Web" by Janet Guyon. Fortune, pp. 61-66, Oct. 25, 1999 (6 pages).

European Patent Office Communication dated Oct. 15, 2004, and EPO Supplementary Search Report for Application No. EP 00 95 2727, Dated: Oct. 15, 2004, issued by the European Patent Office (4 pages).

* cited by examiner

SYSTEM AND METHODS FOR SERVICING ELECTRONIC TRANSACTIONS

BACKGROUND

This invention relates to a system and methods of servicing transactions involving electronic transaction devices, such as universal electronic transaction cards ("UET cards"), and conventional plastic credit cards. The invention also relates to methods of administering a plurality of client accounts for an electronic transaction device or conventional cards.

UET Cards are one type of electronic transaction device known to store, transmit, and receive personal, account, and transactional information. See U.S. Pat. No. 5,590,038, which is incorporated herein by reference. Generally, a UET Card may be a pocket sized device, having a microprocessor, random access memory, a display, and input means, and may be capable of storing personal information such as the card owner's name, address, date of birth, signature, and likeness, as well as the client's social security number. The UET card may also be capable of storing the client's employee number (if applicable), insurance policy number or numbers for various type of insurance, club membership account numbers, credit card company account numbers for a variety of credit card companies, automatic banking numbers for one or more bank accounts, and any other financial or personal transactional information. The UET card may also be capable of processing transactional information and communicating with central processing units or computers operated by the providers of services, such as credit card institutions, banks, health care providers, retailers, wholesalers or other providers of goods or services. The UET card may also be capable of communicating with personal computers, including those used by retailers (point of sale computers), and personal computers used in other business applications or at home. For example, a person may use a single electronic transaction device to conduct financial transactions relating to several credit, debit, or deposit accounts, such as accounts normally associated with VISA, MASTERCARD, AMERICAN EXPRESS, DISCOVER, or ATM (Automatic Teller Machine) banking transactions.

The term "electronic transaction device," as used herein is not limited to a UET Card. In addition to UET Cards, other devices are known which may be used to conduct electronic transactions. Also, known general purpose hand held computers maybe programmed to conduct electronic transactions. These hand held computers typically use operating systems such as, but not limited to, Palm OS or Microsoft Windows CE. It is contemplated that these hand held computers may be adapted to be electronic transaction devices with appropriate programming.

An electronic transaction device allows a client to customize and add functionality to the device as per the client's own specific requirements. The electronic transaction device maybe an "Information Organizer," which in the present environment goes beyond conventional personal information managers. The electronic transaction device allows the client to store, organize and efficiently use personal information, account information, and transactional information.

While these electronic transaction devices have many advantages, including the advantage of combining numerous accounts into a single device, electronic transaction devices do not necessarily reduce the number of service institutions with which the person transacts to maintain the accounts. Rather, known electronic transaction devices may require a client to communicate with each service institution on an independent basis. Also, there may be an instance where a client wishes to continue using a conventional plastic card, yet have additional access and control over account information.

Vendors and clients are also believed to value and collect information about each other. Information that vendors are believed to value includes information about their customers, such as their preferences, requirements and needs. Approaches like database marketing, relationship marketing, permission marketing, and loyalty programs have evolved over time with the overall objective to allow vendors to gather as much information about their potential market as possible, in turn to sell more of their goods and services. For example, vendors may use personal information during direct marketing campaigns (for example, direct mail, telemarketing, or e-mail), or to judge the efficiency of ongoing marketing campaigns with regard to a particular market (for example, advertisements directed to all VISA cardholders).

Despite the value of the information to the vendor, the client typically receives nothing in return for the information that the client surrendered during a transaction or inquiry. Thus, many clients may decline to provide requested information, which may in turn degrade the overall marketing effectiveness of the vendor and the satisfaction of the end customer.

Clients may wish to have additional controls over the release of personal information and account information to various vendors. A client's control over the release of personal information and account information may be required to counteract the extensive efforts and practices of vendors and merchants to obtain information about their markets. Efforts to collect information may include, for example, computer servers that publish Web pages on the Internet which may record the identities of persons viewing information regarding a service or product, and place "cookies," files identifying when a person visited a Web page, on computers of persons viewing a Web page. Also, telephone calls to service centers may record the telephone number, by way of "Caller ID," as well as the address from which the person called. Accordingly, simply inquiring about a service or product may result in a person unknowingly or unintentionally disclosing personal information without any benefit to that person.

Information gathering may also occur during transactions. When using a conventional plastic credit card to purchase goods or services, at a minimum the client must disclose his or her name, service institution, and account number. Often times, additional information, such as an address, telephone number, credit card expiration date, etc. is requested from the client before a transaction is completed.

Clients, like the vendors, may also value information. Information that clients are believed to value includes information about products and services that service institutions and/or vendors have to offer. For example, clients may be interested in airline flight schedules and available fares to a given airline. A client's access to such information is now greatly increase with the advent of telephone call centers and Internet Web pages. However, traditional guards or protectors of privacy have been let down and redefined, creating a certain sense of insecurity. Furthermore, clients have at least partially lost control over their own information. For example, simply calling a vendor to inquire on prices and availability of a product may result in an unintentional disclosure (through caller identification information) of the caller's name, address, and telephone number. Also, many Web pages deny access to information regarding a vendor's products or services if a client attempts to control the release of information by prohibiting "cookies" on the client's personal computer.

Therefore, an impasse may result when a vendor requires more information than a client is willing to release. Such an impasse benefits neither the client nor the vendor.

Many clients want tighter control over their personal information, allowing them to obtain the highest benefit for a disclosure of information when it comes to dealing with the vendors, allowing only so much information to be disclosed for the product or service they desire. Accordingly, there is a need for a service that allows a more efficient use of information, especially as a bargaining tool for better and/or less costly services and products.

Furthermore, currently the vendors have superior information in many respects to the information accessible by the client. The vendors may have sources of information about their market coming from direct or indirect surveys, buying pattern analysis, transaction records and analysis, credit ratings and bureaus, patterns of Web pages visited and purchases made through Web pages, to name a few. Clients would benefit from access to similar information to "level the playing field."

SUMMARY

What is needed is a transaction service provider positioned between a client and a vendor. The transaction service provider could retrieve information, or negotiate for goods or services, from a vendor based on limited information extracted from the client's confidential personal, account, or transactional information, without disclosing the client's identity. Such a transaction service provider would be able to provide accurate and detailed information that the vendors value, while maintaining confidentiality of additional client information.

A transaction service provider, especially, although not necessarily, in conjunction with an electronic transaction device, allows a client to interact with service institutions and vendors conveniently, securely, and, if desired, anonymously, with less paperwork and more value added services.

In one embodiment of the invention, a service transaction provider for administering a plurality of accounts for a client, includes a computer, having a processor, a data storage medium, and a network port. The storage medium is configured to store the clients' personal information, account information, and transactional information. The processor configured to create a database of client information including the client's personal information, account information corresponding to a plurality of accounts associated with the client, and transactional information corresponding to a plurality of transactions conducted by the client; designate as confidential a predetermined first portion of the database client information; designate as non-confidential a predetermined second portion of the database of client information non-confidential; and provide the client with access to the first and second portions of the database of client information via the network port.

In an additional embodiment of the transaction service provider, the storage medium is further configured to store information corresponding to a plurality of vendors and the processor is further configured to create a database of vendor information; receive a transaction request from a client; analyze information in the database of vendor information; analyze information in the database of client information; and provide a suggested transaction to the client based on the information in the database of vendor information and the database of client information. The processor may be further configured to establish communication with a vendor via the network port; disclose information from the predetermined second portion of the database of client information to the vendor; receive information from the vendor; and provide information received from the vendor to the client. The processor may be further configured to establish a communications with a service institution via the network port; receive transactional information corresponding to the client from the service institution; and add the transactional information received from the service institution to the database of client information. The processor may be further configured to establish communication with the client via the network port; receive information from the client; and add the information received from the client to the database of client information. The processor may be further configured to reconcile information received from the service institution with information received from the client.

A method for using an electronic transaction device with an electronic transaction service provider may include the steps of registering the electronic transaction device with the electronic transaction device service provider, registering a plurality of accounts corresponding to a plurality of service institutions, providing a data connection between the electronic transaction device and the electronic transaction device service provider, and storing account information for a plurality of service institutions at the electronic transaction device service provider. The step of registering the electronic transaction device may include registering a client associated with the electronic transaction device with the electronic transaction service provider, collecting and storing personal information from the client, setting up a file on the client and initiating use of the electronic transaction device, archiving the client's password, and archiving the client's data stored on the electronic transaction device. The step of registering the plurality of accounts may include storing account information, storing transactional information, including archiving transactional information older than a predetermined date, and reconciling transactional information with corresponding service institutions.

The step of registering a plurality of accounts corresponding to a plurality of service institutions may also include the steps of storing account information in the database of client information; storing transactional information, and reconciling transactional information received from the electronic transaction device with transactional information received from the plurality of service institutions.

The method for using an electronic transaction device with an electronic transaction service provider may also include the steps of providing access to a database of client information to the client and analyzing transactional information in the database of client information for a plurality of accounts. The method for using an electronic transaction device with an electronic transaction service provider may also include the steps of designating a portion of the client database non-confidential; analyzing the portion of the client database designated as non-confidential for preferences and patterns; and providing analyzed transactional information to a plurality of vendors.

As used herein, the term "service institution" includes any business, service, governmental agency, or other entity, which issues any type of card commonly carried by an individual for the purposes of identification, credit transactions, bank transactions, frequent traveler rewards transactions, licensing, registration or similar functions. Examples of service institutions include, but are not limited to, Banks & Financial Institutions, Health Services, Hospitals and related Organizations, Manufacturers, Vendors, Merchants and Retail Outlets, and Various Government Agencies and other institutions, such as Universities etc. In a healthcare embodiment, "service institutions" may include pharmacies, laboratories, and insurance companies, or any other entity with which a physician or other healthcare provider may use professionally. "Vendors," as used herein, means any seller of goods and/or provider of services. This is a broad term, including, but not limited to, various retailers, service providers, such as health care, insurance, and communication service providers, airlines, etc. A "service institution," may also be a "vendor," and vice-versa. For example, a department store is a vendor. Also, the department store may issue credit cards to its customers, in which case it would also ba service institution.

The information stored, transmitted, or received by the electronic transaction device may include personal information of the client of the electronic transaction device. It may also include account information for each service institution with which the client has an account. As used herein, the term "account information" includes any identifying designation which identifies the electronic transaction device client with a service institution, including but not limited to the client's name, address, phone number, social security number, credit card account numbers, bank account numbers, investment account numbers, license numbers, identification numbers, insurance account numbers, medical identification numbers, and the like. In a health care embodiment, "account information" may include information relating to patients of a physician or other health care provider.

The information stored, transmitted, or received by the electronic transaction device may also include transactional information for accounts with service institutions in which the electronic transaction device client has an account. As used herein, the term "transactional information" includes one or more individual financial transactions, such as credit card transactions, investment transactions, medical treatments, medical payments, insurance payments, and the like. Transactional information may include, but is not limited to, information such as a subtotal, tax, tip gratuity, date, vendor, an image of the receipt, and an image of the client's signature. Transactional information may also include a description of goods or services purchased, including a vendor's stockkeeping codes. In a health care embodiment, "transactional information" may include information regarding the care of a patient, such as office visits, treatments given, medication prescribed, payments for treatments, and the like.

The electronic transaction device may also be used to conduct transactions involving promotional information. As used herein, "promotional information" includes advertisements, electronic facsimiles of coupons, and usage incentives such as frequent flier miles, cash back rebates, or any of various incentive programs offered by credit card issuers.

An electronic transaction device may also be used to conduct transactions involving stored cash value information. As used herein, "stored cash value information" includes information relating to a cash balance which may be stored on the electronic transaction device, credits or debits to the cash balance, a traveler's checks balance which may be stored on the electronic transaction device, credits or debits to the traveler's check balance and graphical images of various denominations of currency and traveler's checks.

An electronic transaction device 12 may also be used to conduct transactions involving government entitlement programs. For example, food stamps, veteran's benefits, or other entitlements may be stored on the electronic transaction device 12. The governmental agency issuing an entitlement could limit use of the benefits to certain stores or goods or services.

The transaction service provider is not limited to "clients" being consumers with credit card accounts. Transaction service providers are applicable to other fields, such as healthcare. In such an embodiment, the "client" may be a physician or other healthcare provider who uses the transaction service provider to administer healthcare transactions involving a plurality of patient accounts.

The foregoing advantages are some examples of the advantages provided by the present invention, and are not intended to be exhaustive. Specific examples of the implementation of the invention are shown in the drawings and are discussed herein. Those examples are intended provide examples of the invention, not to limit it. The scope of the invention is expressed in the claims.

DETAILED DESCRIPTION

Figure 1:
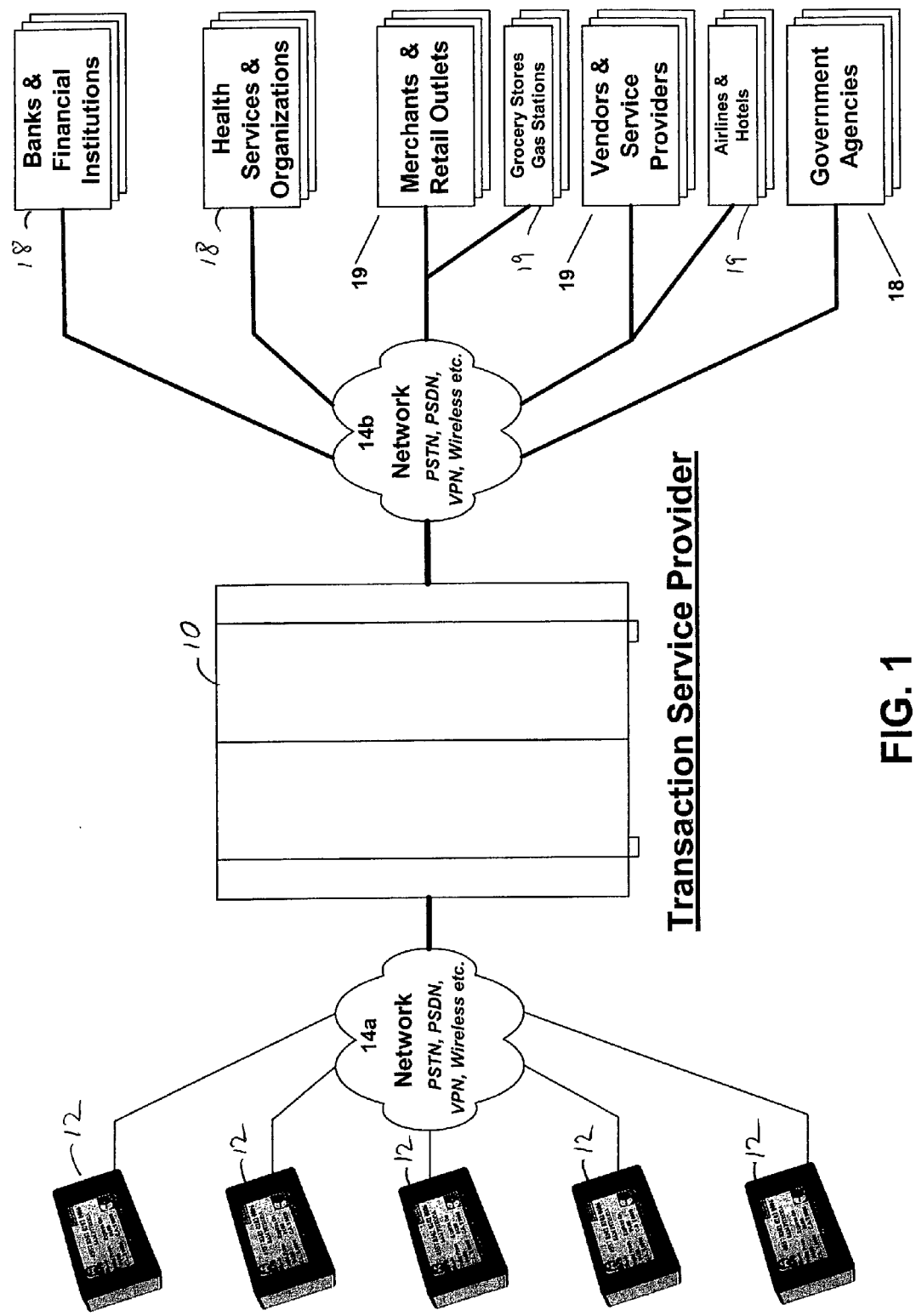
FIG. 1 is a block diagram of a system involving an electronic transaction device service provider.

An embodiment of a transaction service provider 10 is illustrated in FIG. 1. In the embodiment illustrated in FIG. 1, the transaction service provider provides an interface between the clients and the service institutions.

A plurality of electronic transaction devices 12 is coupled to network 14a. The electronic transaction device 12 may be a UET Card. The electronic transaction device 12 maybe provided with interfaces to communicate with personal computers, printers, point of sale terminals, ATMs, and additional devices, through various means, including, but not limited to, conventional magnetic and bar code displays and readers, smart card (ICC) readers, infrared (such as an IrDA standard) or Proximity RF transceivers. See, for example, U.S. Pat. No. 5,590,038. From a physical connectivity standpoint, the plurality of electronic transaction devices 12 could be coupled to the Network 14a using any or all of these communication interfaces. For example, an electronic transaction device 12 could be directly coupled to the transaction service provider thought network 14a. Alternatively, an electronic transaction device 12 may be coupled indirectly, through a personal computer 16 (FIG. 3) and then through the network 14a. The network 14a could be any of the prevailing Public Switched Telephone Networks (PSTN), Public Switched Data Networks (PSDN), Virtual Private Networks (VPN), Wireless Networks etc., or any other network which allows dial up facilities or/and digital packet switching as per existing protocols and standards.

Additionally, electronic transaction devices 12 may communicate directly to each other via the described interfaces and exchange designated information. For example, one electronic transaction device 12 may directly transfer stored cash value or account information to another electronic transaction device 12 via an infra-red port.

In another example, an electronic transaction device 12 may be used as an intermediary to conduct a transaction. In this example, a client may wish to pay for a restaurant bill with a credit card account on an electronic transaction device 12. Rather than requesting that the client physically hand over the electronic transaction device to complete the transaction, a restaurant server may present the bill on another electronic transaction device 12. After reviewing the bill, the client may select a credit card account on the client's electronic transaction device 12 and transmit the account information to the restaurant server's electronic transaction device 12. The restaurant server may then authenticate the account information and the transaction at the restaurant's POS terminal 20, and return an electronic receipt of the transaction to the client's electronic transaction device 12. The client may then sign the electronic receipt on the client's electronic transaction device 12 and return transmit the signed receipt to the restaurant server's electronic transaction device 12. As an added safety measure, the client's account number may be automatically deleted from the restaurant server's electronic transaction device after a predetermined period of time or when the signed electronic receipt entered in the restaurant's POS terminal 20.

In another example, the electronic transaction device may be configured as an access device. It is known for employers to issue access cards, rather than keys, to employees to allow secure access by employees to restricted areas. This function may be added to an electronic transaction device 12.

A plurality of service institutions 18 and vendors 19 are connected to the transaction service provider by network 14*b*. Network 14*b*, like network 14*a*, could be any or all of the PSTN, PSDN, VPN, Wireless Networks, or any other network which allows dial up facilities or/and digital packet switching as per existing protocols and standards. Network 14*b* may be, but is not necessarily the same as Network 14*a*. For example, if a given service institution uses a PSDN for network 14*b*, one client may use a PSTN for network 14*a*, another client may use wireless telephony or PCS communications for network 14*a*, while a third client may use a PSDN for network 14*a*.

The transaction device service provider 10 may be accessed by a client having an electronic transaction device 12 as follows. The client establishes a data connection between the electronic transaction device 12 and the transaction service provider 10 via network 14*a*. As described in U.S. Pat. No. 5,590,038, a variety of interfaces may be used to assist in establishing a data connection with an electronic transaction device 12, such as infra-red wireless, radio frequency wireless, and metallic contact wire-based interfaces. The transaction service provider 10 includes means for storing information, such as known magnetic optical, and electronic storage media.

Figure 2:
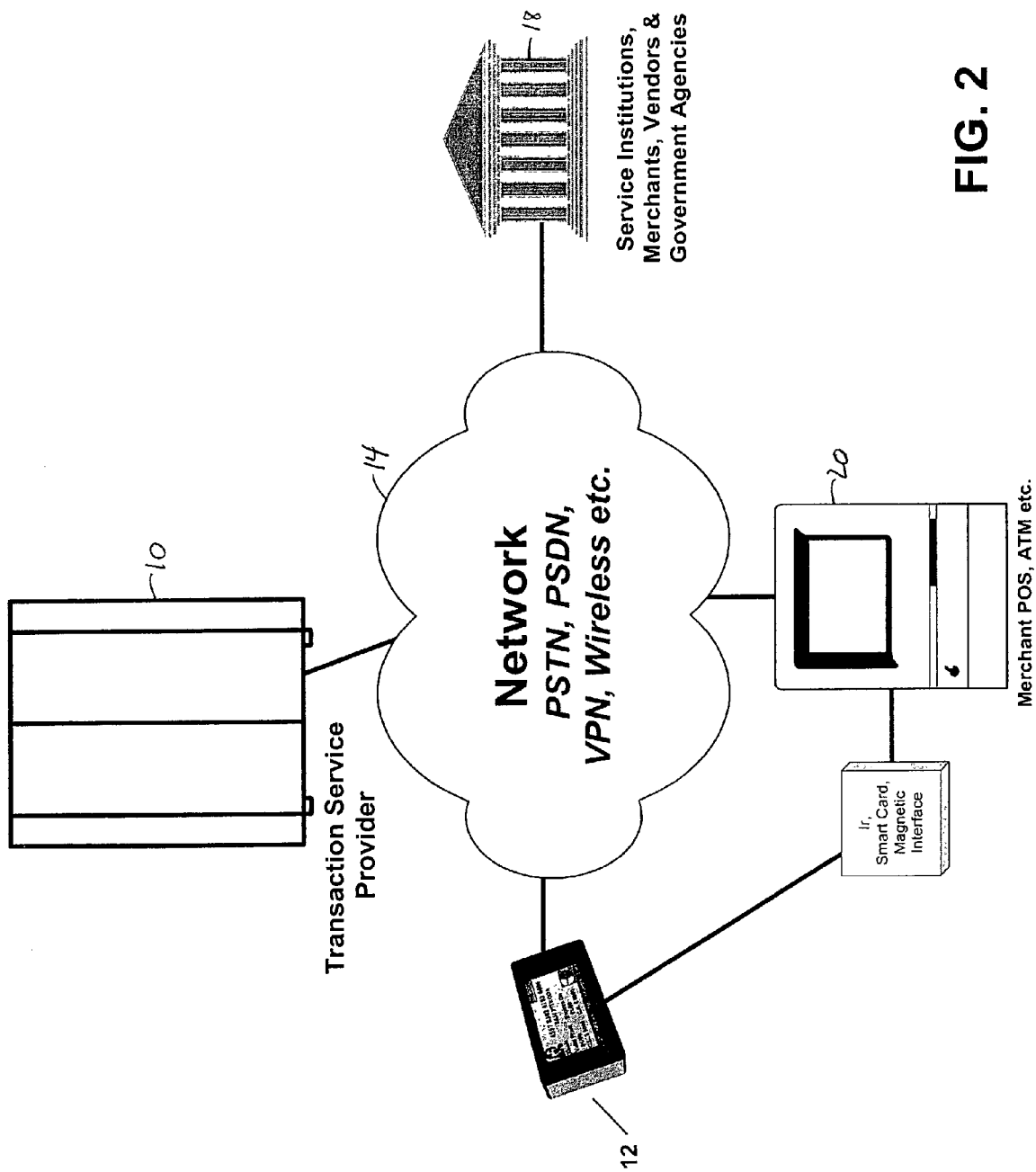
FIG. 2 is a block diagram of one example of a transaction service provider in combination with a transaction environment.

Referring now to FIG. 2, an embodiment of the present invention is illustrated in combination with a known transaction environment used by service institutions. Networks 14*a* and 14*b* are illustrated as a single network 14. Network 14 is connected to the transaction service provider, a plurality of service institutions, and a plurality of Point of Sale ("POS") terminals 20. POS terminals, as the term is used herein, refers to terminals used by service institutions to conduct transactions including, but not limited to, vendor operated sales terminals, such as the card readers found at grocery stores, automatic teller machines ("ATMs"), filling station fuel pumps, governmental agency terminals, such as those which may be used by Motor Vehicle Inspectors, highway toll booths, or any other terminal equipment related to a service institution or vendor. A Point of Sale terminal 20 may also comprise an electronic commerce server connected to the Internet.

A plurality of electronic transaction devices 12 may connect to the network 14 or directly to POS terminal 20. Connecting an electronic transaction device 12 to a POS terminal 20, for example, would allow the client to conduct a transaction, such as making a purchase from a vendor using a service institution account, such as MasterCard, Visa card, American Express, Diners Club, Discover card, or other credit or debit card. The connection may be established with infra-red wireless, radio frequency wireless, metallic contact, bar code reader-display, magnetic stripe, or other suitable data exchange medium. In addition, conventional plastic cards may be used at the POS terminal 20.

Coupling an electronic transaction device 12 to the network 14 would allow the electronic transaction device 12 to communicate information with the transaction service provider. This communication of information would complete a loop between the client and the POS terminals provided by the various service institutions, and the transaction service provider. Also, a vendor's POS terminal 20 may be accessed by the electronic transaction device 12 via network 14, such as a purchase through an Internet Web page.

Figure 3:
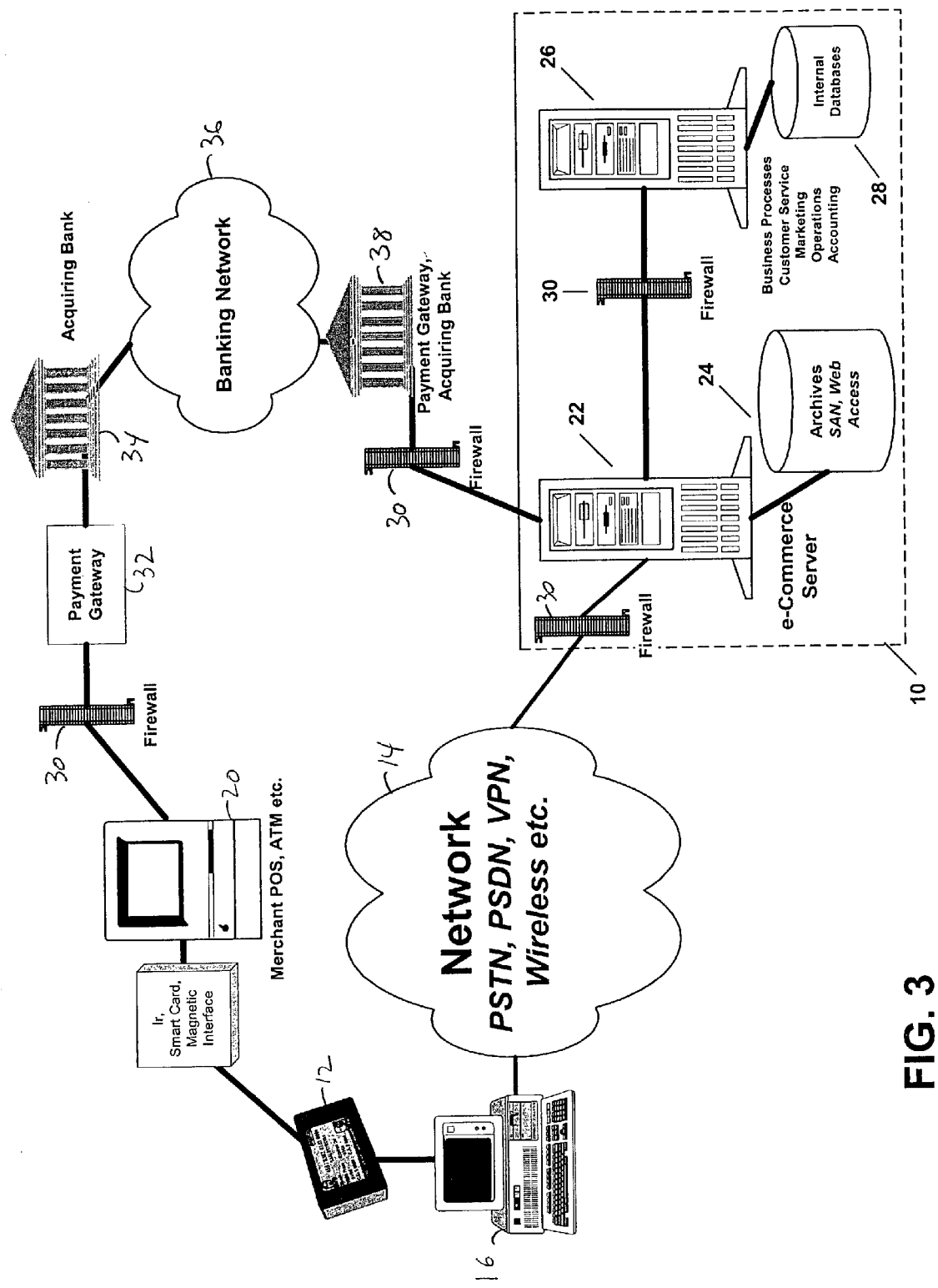
FIG. 3 is another block diagram of an example of a transaction service provider in combination with a transaction environment.

Referring now to FIG. 3, an embodiment of the transaction service provider 10 is illustrated. In the example illustrated in FIG. 3, a transaction service provider 10 includes a network of e-Commerce servers and databases, with support network and connectivity equipment. A suitable e-Commerce server may include a general purpose computer, including a processor, a data storage medium, and a network port. As used herein; the indefinite article "a" means one or more unless specifically indicated otherwise. For example, "a processor" may include a plurality of processors. The transaction service provider includes an e-Commerce server 22, transaction service provider archive 24, a internal server 26 and internal database 28. The e-Commerce server 22 may be physically combined on the same server with the internal server 26. Also, the transaction service provider archive 24 may be combined with the internal database 28. However, much of the information handled by transaction service provider is confidential. Accordingly, it may be desirable to employ physically and/or logically separate servers and databases to facilitate the inclusion of security firewalls 30. For example, in the illustrated example, a first firewall 30 may be included between the network 14 and the e-Commerce server 22, and a second firewall 30 may be included between the e-Commerce server 22 and the internal server 26.

The e-Commerce server 22 may be a conventional network server. The c-Commerce server 22 includes a network port which allows both the electronic transaction device 12 and the service institutions to connect to the service institution 18 through network 14. The e-Commerce server 22 handles the bulk of the interfacing with the electronic transaction devices and/or personal computers and the service institutions. The transaction service provider archive 24 may be stored on any suitable data storage medium, including, but not limited to, magnetic or optical disk drives, magnetic tape drive, solidstate memory, or any other suitable means for storing information. Transaction service provider archive 24 is a database of personal, account, transactional, and/or promotional information. A portion of the database of personal, account, transactional, and/or promotional information corresponding to a given client may be accessed by an electronic transaction device 12 registered to that client through the transaction service provider. Alternatively, the client may use a personal computer 16 to access the transaction service provider archive 24. In addition, the transaction service provider may have access to information in the transaction service provider archive 24 corresponding to a plurality of clients, subject to restrictions on use of that information as may be designated by each individual client.

The internal server provides backend processing for support functions including Customer Service, Operations Management, Accounting, Marketing & Advertising, and various other Business Processes. The internal server 26 and the internal database 28 are generally not accessible by electronic transaction devices.

In the example illustrated in FIG. 3, the e-Commerce server 22 of the transaction service provider 10 is also connected to a banking environment through a firewall 30. In this illustrated example, a POS terminal 20 is connected through a firewall 30 and a payment gateway 32 to an acquiring bank 34. Acquiring bank 34 is connected to a banking network 36. Additional banks 38 are connected to the banking network. The transaction service provider 10 is connected to the banking environment through at least one of the banks through the firewall 30.

In this example, an electronic transaction device 12 may be used at the POS terminal 20, in this case, an ATM. In other examples, conventional plastic credit cards or ATM cards may be used at the POS terminal 20. Transaction and account information is then transmitted from the POS terminal 20 via the service institutions to the transaction service provider 10.

In this manner, electronic transaction devices, conventional credit cards, or a combination of the two, may be used to conduct additional transactions with the same or additional vendors. Also, the client may use a number of different accounts to conduct transactions. For example, the client may use a conventional card at an ATM then use and an electronic transaction device 12 to charge an airline ticket to a selected credit account and credit frequent flyer miles to the user's airline frequent flier account. The transaction and account information for each transaction may then be forwarded by the respective service institution handling the transaction to the transaction service provider 10.

In the example of transactions involving use of an electronic transaction device 12, the transactional information is also recorded by the electronic transaction device 12. The transactional information may or may not include an authorization from the service institution 18 corresponding to the selected account codes or confirmation code. The information stored on the electronic transaction device 12 may then be reconciled with the information recorded by the transaction service provider 10 by establishing communication between the electronic transaction device 12 and the transaction service provider 10. Any confirmations or authorizations of previous transactions may be added to the electronic transaction device as well. In the illustrated example, communications are established through a personal computer 16 and network 14. However, electronic transaction devices may be configured with appropriate communications circuits to allow direct connection to any of the embodiments of network 14.

In the example of transactions involving conventional plastic cards, the transaction service provider 10 records and stores transaction information for a plurality of transactions occurring on a plurality of accounts. Accordingly, a client who uses conventional cards has the benefit of consolidated reporting of transactions without carrying an electronic transaction device 12.

The transaction service provider 10 may request personal information, such as a client's name, address, telephone number, and other identifying information. The transaction service provider 10 may set up a file on the client and initiate use of the transaction service provider 10 and, optionally, an electronic transaction device 12 and/or conventional plastic credit cards or other accounts.

For a registered client, the transaction service provider 10 may archive a list of the client's passwords (or any other security codes) for the client's electronic transaction device 12 and store the client's personal information. The transaction service provider 10 may also archive additional personal information, such as address and contact lists, calendars, to-do lists, and other software and/or databases which the client may have installed on the electronic transaction device 12.

The transaction service provider archive 24 stores information relating to a plurality of clients. The information includes, but is not limited to, personal, financial, account, transactional, personal preferences, and promotional information. Examples of the information include:

a) Personal
  1. Name
  2. Address—Home, Work
  3. Telephone—Home, Work
  4. Social Security
  5. Date of Birth
  6. Marital Status
  7. Drivers License, Insurance Cards, Employer Identification Cards etc.
  8. Number of Children and other family details b) Financial
  1. Credit Card, Debit Card, Cash Cards etc.
  2. Income—Information regarding various sources etc.
  3. Bank Accounts—Information regarding the different Banks, the different types of accounts, Balances etc.
  4. Payment Information—Mortgages, Loans, Bills etc.
  5. Investment Information—Stocks, Bonds, Equity, Real Estate etc.
  6. Transaction Information—Amounts, Form of Payment, Date of Transactions, Details on Purchases etc.

c) Health
  1. Gender, Height, Weight, Blood Group, Color—Hair, Skin, Eyes etc.
  2. Medical Profile—Detail information regarding past and present medical history which would include various surgeries done, prescribed medications, past illnesses and ailments, allergies, ongoing medication and treatment, hereditary or genetic concerns, family history, etc.
  3. Name and other contact details of doctors—Personal Physicians, Specialists etc.
  4. Name and other details regarding the Clinics, Hospitals, Emergency Services and Laboratories previously visited, and/or preferred for future needs d) Information Manager
  1. Appointments
  2. Address and telephone book
  3. To Do lists
  4. Memos and notes e) Miscellaneous
  1. Preferences—Likes and dislikes, certain products and services required on an ongoing basis etc.

2. Insurance providers, Telephone companies—local, long distance and wireless, Hotels, Airlines, Auto Rental companies, Retail outlets and Merchants, Club Memberships previously used and/or preferred for future needs 3. Family details, Birth dates etc.

The transaction service provider 10 may also facilitate applying for new accounts from service institutions 18, or renewing existing accounts. The client may download new account applications from the transaction service provider 10. The client would then send the new application, or request for renewal, to the transaction service provider 10, which would then contact the corresponding service institution 18. Once the application or renewal is approved, the transaction service provider 10 would notify the client, and the client would be able to download the account information necessary to use the new or renewed account.

Alternatively, the transaction service provider 10 may assume some or all of the functions of a service institution and issue credit cards or other accounts.

Figure 4:
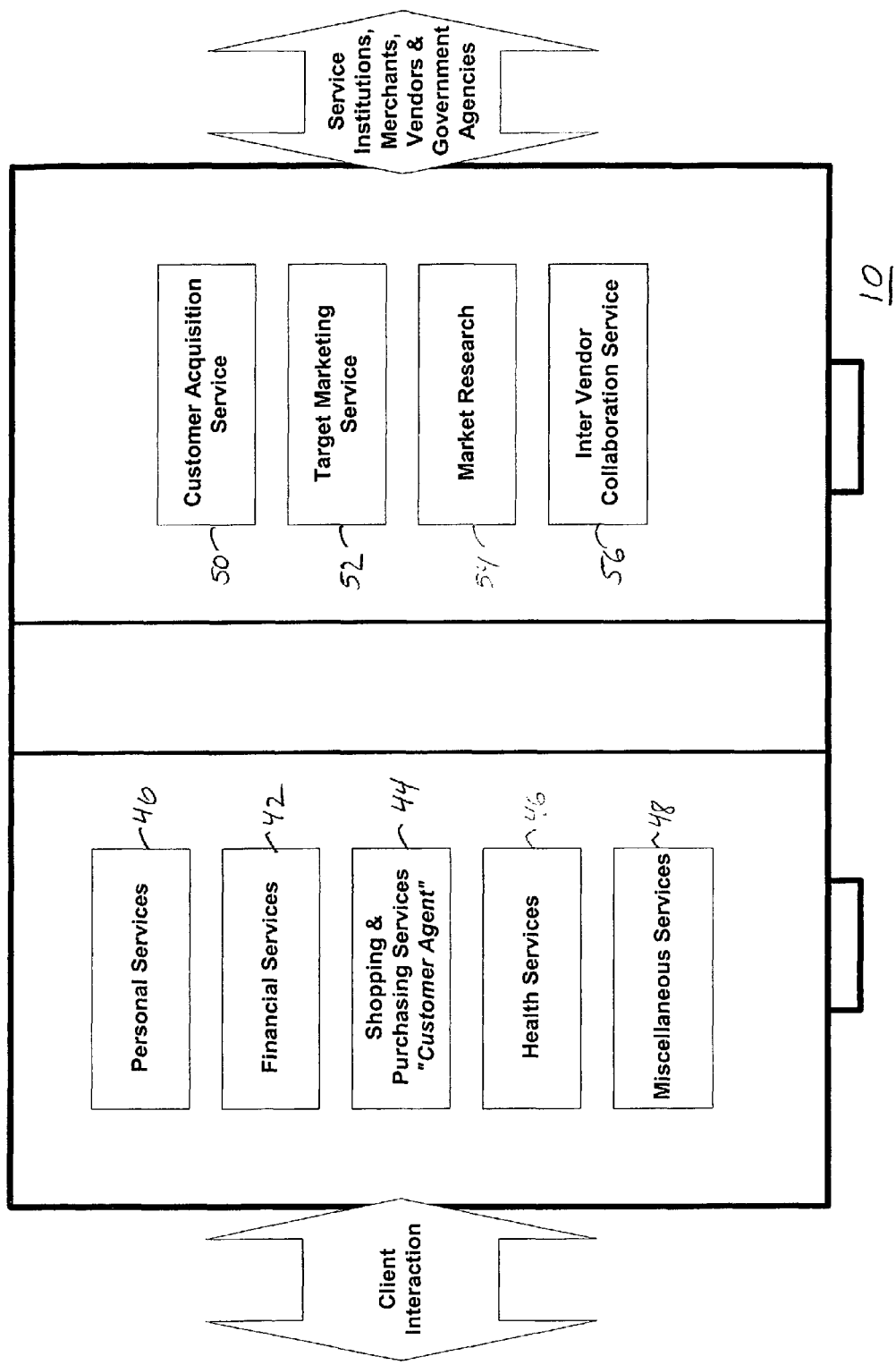
FIG. 4 is a block diagram of an example of a transaction service provider.

Referring now to FIG. 4, various client services and products may be offered by the transaction service provider 10, either independently or through a partnering service institution. A "partnering service institution" means an institution that provides a portion of the services associated with a given account. In the example of a credit card, a service institution may be MASTER CARD. A partnering service institution may be an issuing bank that issues MASTER CARD accounts, such as CITIBANK. The client services may include personal services 40, financial services 42, shopping and purchasing services 44, health services 46, and miscellaneous services 48.

Personal services 40 include privacy, shielding, new device, new account, account removal, device removal, lost card, lost device, resume card, resume device, awards and promotions, bill paying, transaction records and data management, analysis and consultation, and grouping services.

Privacy services include maintaining the confidentiality of all information that the transaction service provider 10 has access to regarding their clients. Controlled and partial access to this information would only be given to the service institutions on prior consent by the client to fulfill a specific objective, such as conducting a purchase or obtaining a service on behalf of the transaction service provider 10 client.

Shielding services include restricting and controlling access to clients' information from the various service institutions and vendors.

New device services include issuing a new electronic transaction device 12 to a client. Issuing a new electronic transaction device 12 would include issuing the device hardware and/or setting up the various interfaces and applications for the client, which in turn would include the registration of the new client, creation and storage of passwords etc.

Issue account services include activating specific accounts, such as credit cards, on an electronic transaction device 12. The application for new cards from the issuing banks and service institutions may be provided by the transaction service provider 10, or alternately by the issuing service institution. Once the application has been approved by the issuing service institution, the specific card(s) may be downloaded from the transaction service provider 10 to the electronic transaction device 12.

Issue account services may also include activating a sub-account for a particular account. The sub-account may have limits imposed by a client. For example, a client may wish to allow a child to have use of a certain credit card account. The transaction service provider 10 may download the appropriate account information into a electronic transaction device 12 assigned to the child. Furthermore, the client may wish to impose preset spending limits on the child's use of the sub-account. The client may designate with the transaction service provider 10 that the sub-account be used no more than given number of times per week, or set spending limits per transaction or per a given timeframe, or authorize only certain types of transactions (e.g., gasoline and grocery purchases, but not department store purchases).

Account removal services include removing a particular account, such as a credit card (and, freezing the various services associated with that particular card) from an electronic transaction device 12. Device removal services include terminating all services associated with an electronic transaction device 12.

Lost electronic transaction device services include freezing all services in the event of a lost device. Resume Services include setting up a new electronic transaction device 12 and resumption of the services.

Awards & Promotions services include offering and allowing the client to download various awards and promotions based on their transactions and records. In one example, electronic coupons may be downloaded. These promotions may be offered directly by the service institutions and vendors. Alternatively, promotions may be offered directly to the clients by the transaction service provider 10.

Bill paying services include the transaction service provider 10 paying the client's bills, based on an independent arrangement. This arrangement at times may be in terms of offering a better interest rate and payment plan compared to the Service Institutions, an insurance plan against unemployment, theft etc. or simply a service for their client's convenience.

Transaction Records & Data Management services include creating a database of transaction records, and allowing access to the transaction service provider clients. For example, a client could access the database corresponding to the client and request all transactions concerning a given vendor. The transaction service provider 10 would return all transactions concerning that vendor for all accounts registered with the transaction service provider 10.

Analysis & Consultation Services include offering transaction service provider clients analysis and consultations based on their transaction records and history. Such services may include, for example, professional services such as tax and accounting services.

Financial services 42 include banking services, retail services, investment services, and insurance services.

Banking Services include e-Banking, e-Cash, e-Check, Bill payments, Loans, Mortgages, and Tax Services. Retail Services include Credit Cards (MasterCard, Visa, American Express, Discover, Diners Club etc.), Purchases, Loyalty, Rewards. Investment Services include Stocks, Bonds, Portfolio Management. Insurance Services include insurance for Auto, Home, Life, Business.

Shopping and purchasing services 44, also referred to as "customer agent" services, include matching, identifying, purchasing, negotiating and analytic services.

Matching Services include matching a client's specific requirement with the various vendor or Service Institutions offerings. For example, if a client wishes to buy a refrigerator, the client may engage the matching service of the transaction service provider 10. The transaction service provider 10 would then contact the various vendors that sell refrigerators and collect the information, including model designations and prices for the client, and in turn provide that information to the client. The transaction service provider 10 may suggest the best bargain for the client in terms of the preferences detailed by the client, with an emphasis on cost, features, warranty etc.

When the transaction service provider 10 contacts the vendors, it may release certain information selected by the client to enhance the quality of the responses, and withhold other information. In the example of the refrigerator, the client may authorize the release of information such as the number of persons living in the client's household. This information may assist the vendor in suggesting an appropriately-sized model for the client to purchase. However, the transaction service provider 10 would not disclose other personal information, such as the client's name, address, or telephone number.

This service would be extended to all products and services offered by the service institutions associated with the transaction service provider 10. In another example, a client may wish to negotiate airfare to a selected destination. To enhance his or her bargaining power, the client may authorize the disclosure of his or her travel history for during the previous year. A particular carrier may value the repeat business that the client has given the airline in the past and may wish to offer a special fare to retain that loyal client rather than lose that client to another airline. The transaction service provider 10 can use the client's travel history as a bargaining tool without disclosure of the client's identity. Thus, the transaction service provider 10 acts as the Customer's Agent, negotiating for information to conduct purchases on behalf of the client without revealing the clients identity to the vendor until the actual purchase is finalized.

Additional services of the shopping and purchasing services include identifying goods and services, purchasing goods and services, negotiating terms, such as quantity discounts, payment terms, etc., custom design and particular requirements, analytic services, such as reports on products and services by consumer advocacy groups, independent reports and analysis etc.

Health Services include compiling a health profile, including history and data. Health services also include conducting hospital interactions for the purposes of updating medical history, bill payments, medical insurance etc., HMO interactions, Emergency Services—Ambulance, Personal Physician etc., interactions with Insurance Companies, Drug Stores & Pharmacies.

Miscellaneous Services include government services, educational services, telecom services, transportation services, weather services, including emergency notification of dangerous weather events, and special events.

Government Services include Department of Motor Vehicle services, Passport and Visa, services, IRS and Tax related services, Social Security and Welfare services, etc.

Educational Services include School and College related information—registration, course selection, tuition payment plans and arrangements, library resources etc.

Telecom Services include Service provider selection, Net Access, Billing and Conflict resolution, Custom Services etc.

Transportation services include Gas, Parking, Toll, Violation/Ticket Payments, Car rentals—reservations, payments, coupons etc., Airline Services—Reservations, Ticketing, Check In, Frequent Flier and Bonus Miles etc., Hotel Reservations, Restaurant—Suggestions and Reservations.

Based on the profile created and various services offered by the transaction service provider 10, the transaction service provider 10 is in the unique position to safeguard the interests of the clients by isolating their identity from the vendors, and at the same time giving the clients access to the products, services, promotions and advertising they desire.

The transaction service provider 10 also addresses the interests of the vendors. Again, since the transaction service provider 10 is in the unique position, where it has access to the information designated non-confidential by a plurality of clients, the transaction service provider 10 can offer the vendors services such as customer acquisition services 50, target marketing services 52, marketing research services, 54, and inter-vendor collaboration services 56.

Customer Acquisition Services 50 include matching up clients with a vendor's goods or services. Since the transaction service provider 10 would have a very comprehensive profile on their clients, they are in the unique position to offer vendors a steady flow of customers for their products and services. Considering the time and resources the vendors commit to develop a loyal customer base, this service would prove invaluable.

Target Marketing Services 52 include assisting vendors in targeting a well-focused market. The transaction service provider 10 is also in a position to assist the vendors in targeting their marketing efforts based on the client profile information the transaction service provider 10 has access to, considerably reducing the efforts directed towards "non-existing" markets by the vendors and increasing their overall profitability.

Marketing Research Services 54 include assisting a vendor in providing appropriate goods and services. Based on the fact that the transaction service provider 10 has a comprehensive profile on their clients, which includes detail preferences, likes-dislikes etc., the transaction service provider 10 can assist their partnering vendors in developing better products and custom tailored services.

Inter-Vendor Collaboration Services 56 include matching vendors and service institutions. Apart from a large client base, the transaction service provider 10 will also have a large number of service institutions and vendors as registered members, with a comprehensive profile on their products and services. This would allow the transaction service provider 10 to act as a "catalyst" for the Service Institutions for the purposes of forming alliances, mergers or possibly even acquisitions, to offer better products and services to their customers.

Considering the sensitivity surrounding the nature of information regarding their clients and service institutions that the transaction service provider 10 will have access to, it is of paramount importance that confidentiality be maintained. The only client information that the transaction service provider 10 will release to the vendors will be pre-approved by the clients, and with the objective of providing a better product or service. This information surrounding the clients may be distributed into three categories, profiles, transaction record analysis, and preferences.

Regarding the profiles category, this is the information compiled by the transaction service provider 10 on their clients through direct means—interactive questionnaires, surveys, interviews, through pre-approved external agencies etc. With respect to Transaction Records Analysis, this is the information compiled by the transaction service provider 10 through analysis of its client's records, buying patterns and frequency, preferences based on these analysis etc. Regarding preferences, this is the information compiled by the transaction service provider 10 through preferences, like and dislikes etc., specified by the client.

Figure 5:
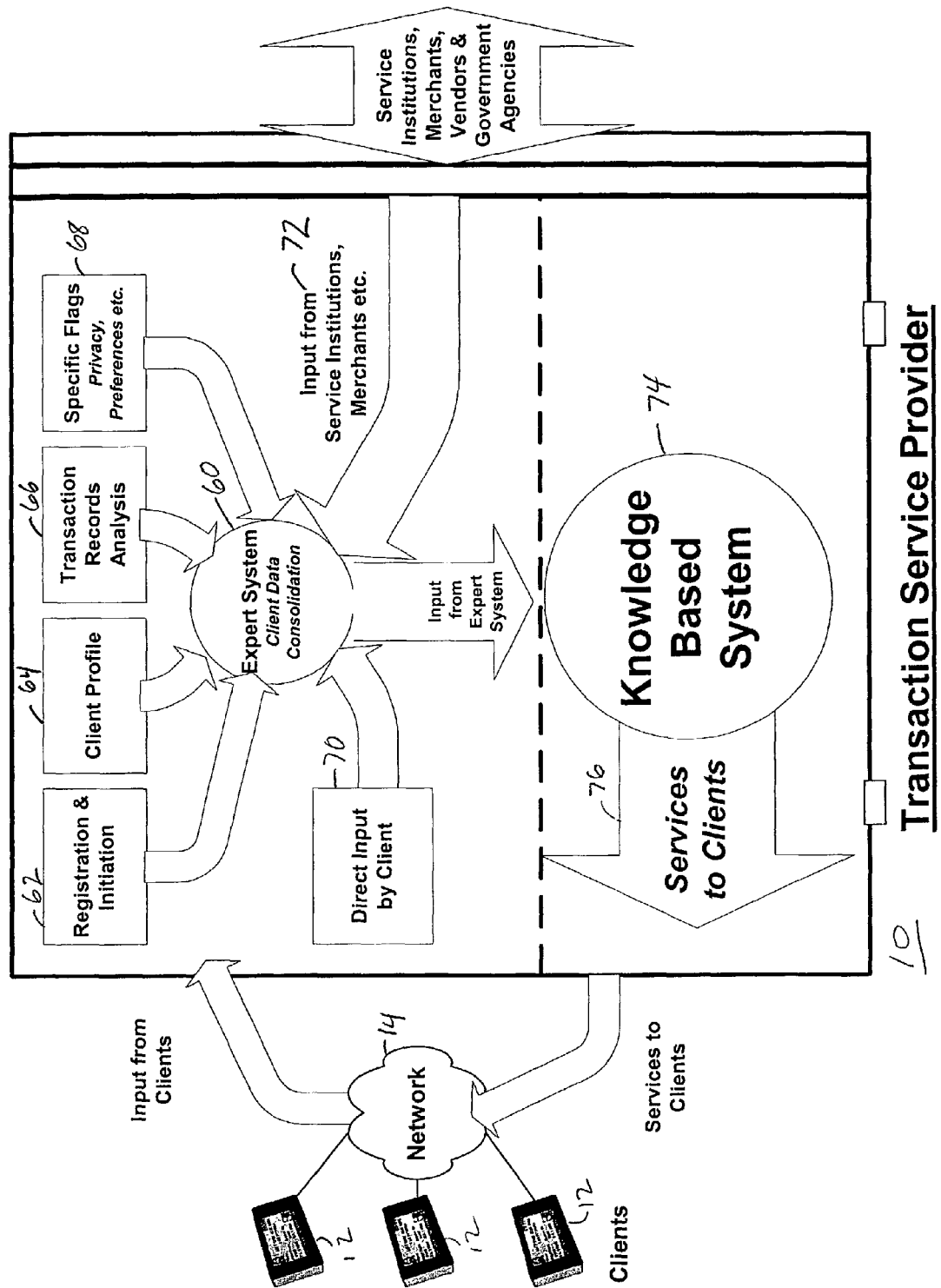
FIG. 5 is a block diagram of a client interaction portion of an example of a transaction service provider.

Referring now to FIG. 5, a portion of one example of the transaction service provider 10 system dealing with the client-side information consolidation process is illustrated. Clients, both electronic transaction device clients and conventional card clients, may connect to the transaction service provider 10 through the network 14. The transaction service provider 10 collects information regarding the client as set forth above. The transaction service provider 10 may use an expert system 60 to analyze clients' personal, transactional, and account information. Information input to such a client data consolidation expert system 60 may include Registration & Initialization Information 62, Client Profile Information 64, Transaction & Records Analysis Information 66, and Specific Flag Information 68, such as Privacy and Secrecy Specifications, Special Preferences, etc.

Apart from these inputs, the other information being fed into the Client Data Consolidation expert system 60 may include Direct Input 70 specific instructions from the client and Consolidated Input 72 from the service institutions and vendors. For instance, the Registration Information 62 would be compiled based on surveys and interviews, the complete Client Profile 64 compiled using information from external agencies, over and above the direct information provided by the clients. The Transaction and Records Analysis 66 conducted by the transaction service provider 10 would be offered as a service to the client in the desired form and format, and would also be fed back into the expert system to form an input to the overall service offerings to the clients by the transaction service provider 10. The Specific Flag Information 68 and Direct Input 70 by the clients form the preferences outlined by the clients. The consolidated input from the Service Institutions, may include information about the vendors that would affect the overall client profile, and consequently the services offered to the clients. The output of this client data consolidation expert system 60 may be provided as an input to a knowledge-based system 74 of the transaction service provider 10, which would eventually decide the services being offered to the Clients and the Service Institutions 76. As shown in FIG. 5, the client data consolidation expert system is preferably isolated from the other processes to ensure the confidentiality of designated confidential information by the clients.

Figure 6:
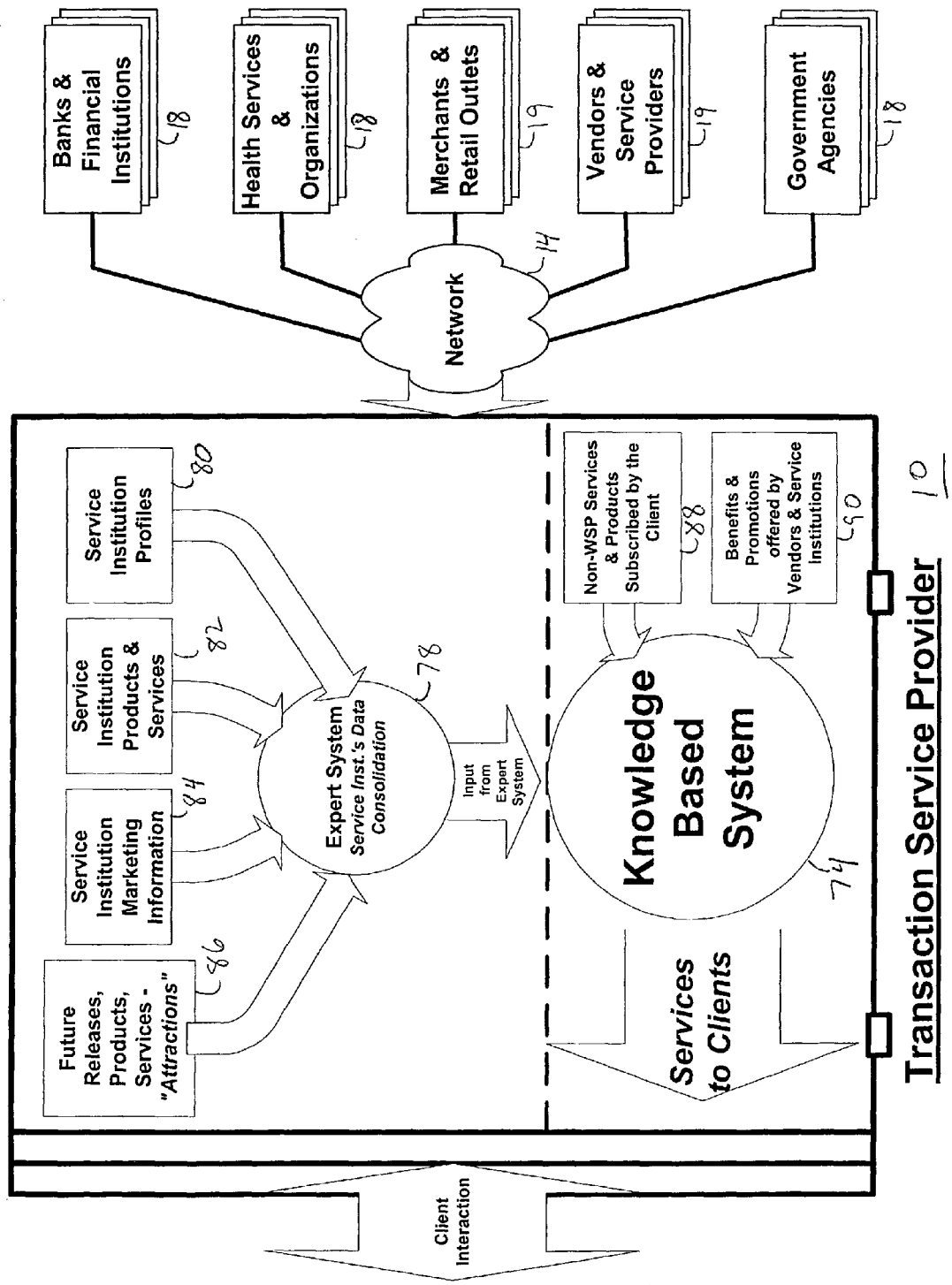
FIG. 6 is a block diagram of a vendor interaction portion of an example of a transaction service provider.

Referring now to FIG. 6, a portion of one example of the transaction service provider 10 system relating to the vendor data consolidation process is illustrated. The transaction service provider 10 may use another expert system 78 to perform the vendor data consolidation. The expert system collects and assembles a complete profile on the service institutions and vendors through various sources, may include profile information 80, products & services information 82, marketing & advertising information 84, information in terms of future releases of products and services 86 (e.g., "Future Attractions").

This information would be compiled from the service institutions 18 and vendors 19. The complete profile may be provided as another input to the knowledge-based system 74, which would eventually determine the services offered to the client, service institutions and vendors. Two sources which form a direct input to the knowledge-based system 74 are the services and products subscribed by the clients which the Service Institutions are committed to provide directly to the clients 88 (e.g. Credit Card services—If a client has applied to Citibank for a MasterCard, Citibank is obligated to provide this service to the client. The interfaces for this credit card would be downloaded onto the electronic transaction device 12 by the client from the transaction service provider 10. The transaction service provider 10 provides the initiation, registration and maintenance of the account, tracking and storing all transactions, and forms the intermediary as discussed before between Citibank and the clients). The other illustrated input sources are the promotions, awards offered by the Service Institutions directly to the clients 90 (e.g. Frequent flyer miles offered by American Airlines to a transaction service provider client). Again, this processing environment would be kept isolated from the other transaction service provider 10 processes.

Figure 7:
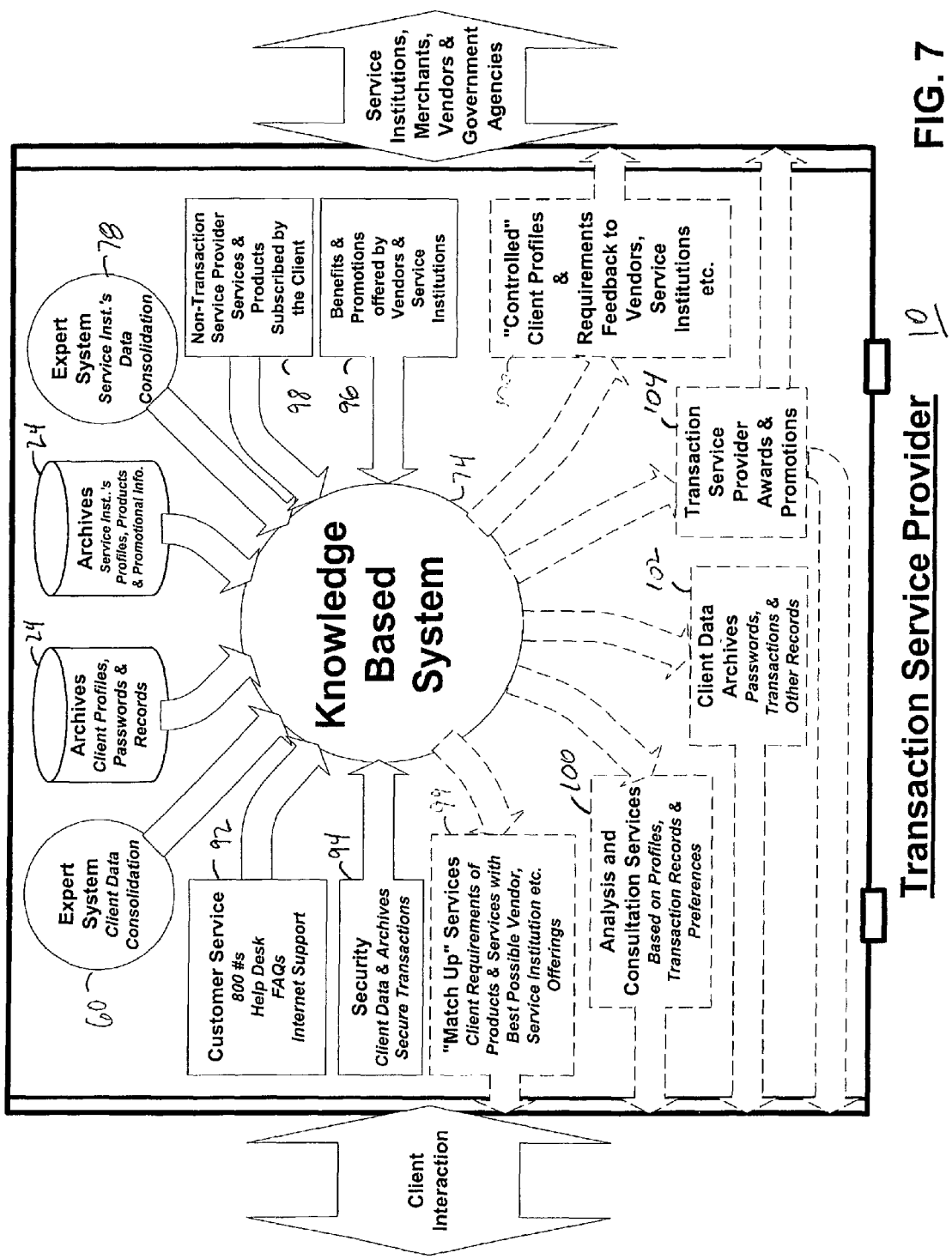
FIG. 7 is a block diagram of another portion of an example of a transaction service provider.

FIG. 7 illustrates an example of a complete system, at the center of which is the knowledge-based system. The knowledge based system operates based on the various inputs it receives and the guidelines defined by the transaction service provider charter. The various inputs to the knowledge based system may include the outputs of the Client Data Consolidation & Service Institution Data Consolidation expert systems 60 and 78, the respective Archives 24 which store all the relevant Client Data and Service Institution Data, a Customer Service Input 92 which handles all direct requests from the clients, all Security guidelines 94 ensuring confidentiality and the Services and Products, the Benefits and Promotions offered by the Service Institutions directly to the clients 96, and additional services 98 other than those provided by the transaction service provider 10. The output of the knowledge-based system 74 determines the various services offered by the transaction service provider 10 to the clients and to the Service Institutions 18. These services include "Match-up" services 99, Analysis and Consultation Services 100, and Client Data Archives 102. The transaction service provider 10 may also offer promotions and awards 104 based on client transaction records, allowing their clients and Service Institutions to download these awards along with other ongoing services and products. The transaction service provider 10 also provides controlled client profiles and requirements to vendors and service institutions 106.

Figure 8:
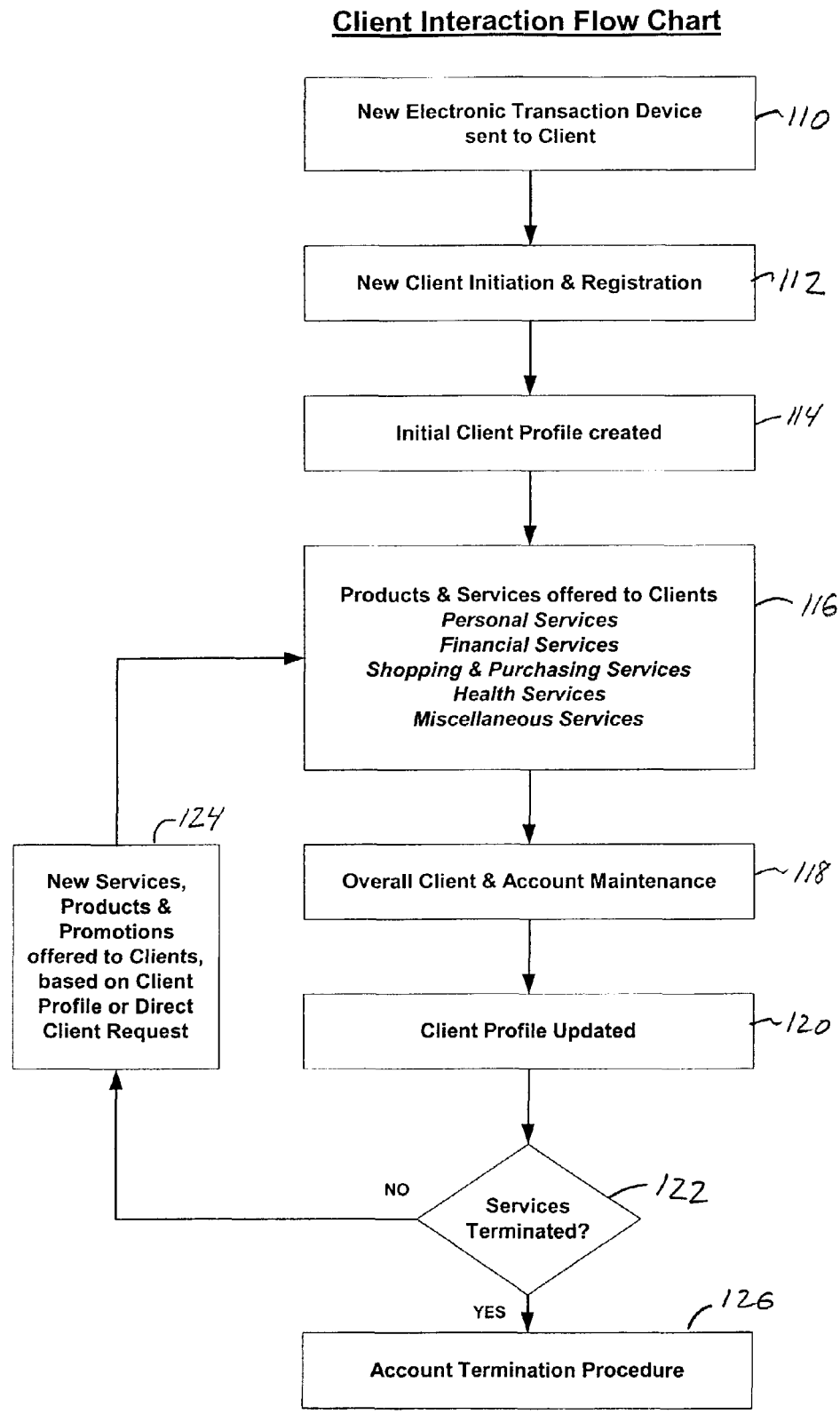
FIG. 8 is a flow chart of examples of steps of interaction conducted by a transaction service provider.

FIG. 8 is a flow chart of an example of steps for initiating a client and the client's electronic transaction device 12. The steps need not be followed in the exact order as illustrated. Also, with the exception of the first step, the illustrated client interaction steps are equally applicable to clients who use conventional plastic cards rather than the illustrated electronic transaction devices. Also, as mentioned earlier, the electronic transaction device 12 may be used to interface with the transaction service provider 10 and various Service Institution POS Terminals, other Terminal equipment etc.

The first illustrated step, step 110, is send a new electronic transaction device 12 to client. Step 110 is not a prerequisite for transaction service provider services, and is performed only if requested by Client. Additional illustrated steps are step 112, New Client Initiation & Registration, step 114, Create Initial Client Profile, and step 116, Offer transaction service provider Products & Services to Clients. Products & Services offered to Clients include Personal Services, Financial Services, Shopping & Purchasing Services, Health Services, and Miscellaneous Services. Continuing with FIG. 8, step 118 is perform Overall Client & Account Maintenance, step 120 is Update Client Profile, and step 122 is Check whether transaction service provider 10 services are canceled. If the services are not canceled, step 124 relating to New Services, Products & Promotions Offered to Clients, Based on Client Profile or Direct Client Request may be executed. If the services are canceled, step 126, Account Termination Procedure may be executed.

Figure 9:
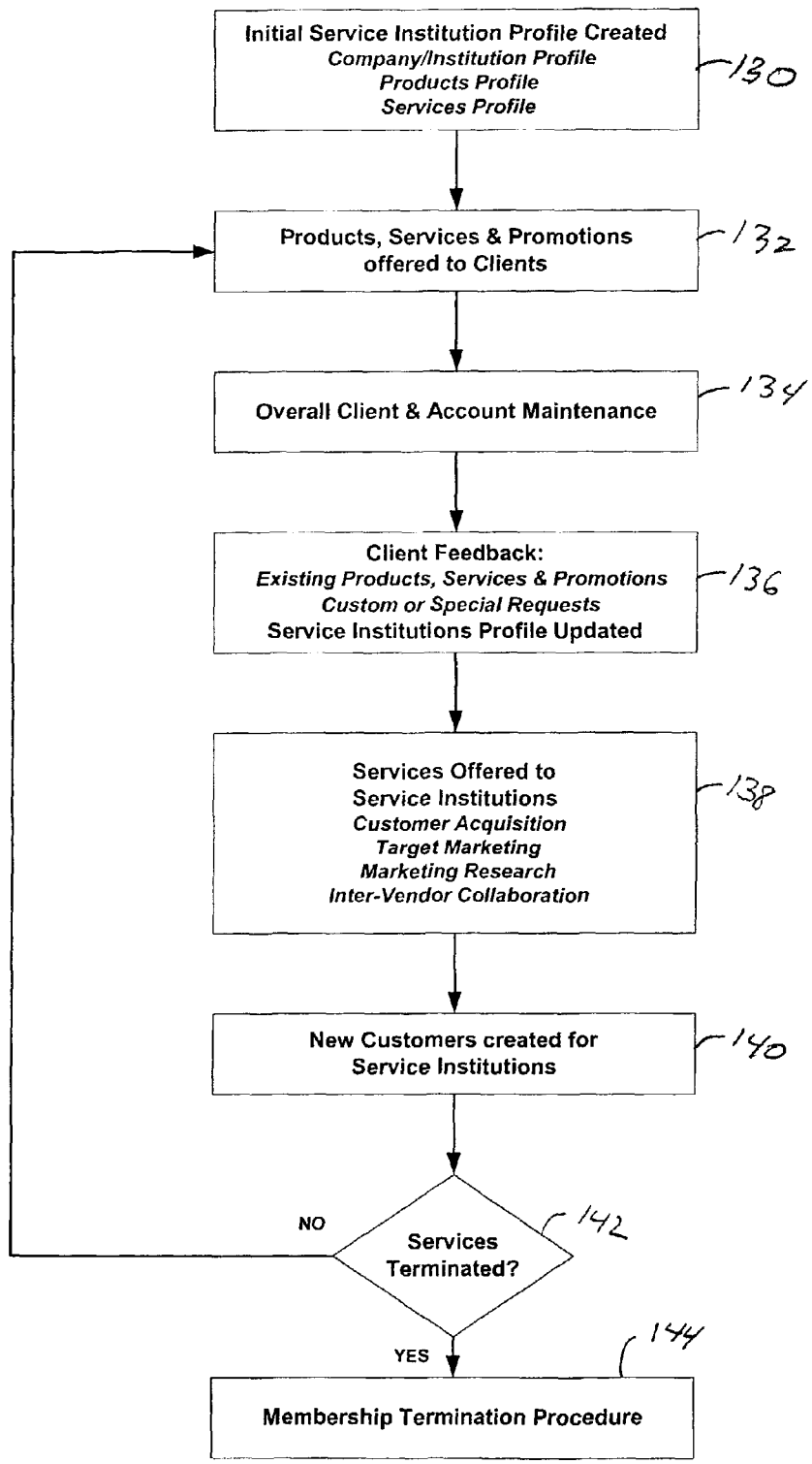
FIG. 9 is a flow chart of examples of steps of vendor interaction conducted by a transaction service provider.

Referring now to FIG. 9, a flow chart of an example of Service Institution Interaction with the transaction service provider 10 is illustrated. The illustrated steps include step 130, Create Initial Service Institution Profile. The profile may include a Company/Institution Profile, a Products Profile, and a Services Profile. Additional steps include step 132, Offer Products, Services & Promotions to transaction service provider clients, step 134, perform overall transaction service provider Client & Account Maintenance, and step 136 receive transaction service provider Client Feedback. The feedback may include Existing Products, Services & Promotions, and Custom or Special Requests. As a result, Service Institutions Profile may be updated.

Continuing with the steps in FIG. 9, step 138 is Offer transaction service provider Services to Service Institutions and vendors. The services include Customer Acquisition, Target Marketing, Marketing Research, and Inter-Vendor Collaboration. Step 140 is create New Customers for Service Institutions and vendors.

At step 142, the transaction service provider 10 checks whether transaction service provider services are terminated. If the transaction service provider services are not terminated, then the step 132 is repeated. If transaction service provider services are terminated, step 144, membership termination procedure is executed.

Figure 10:
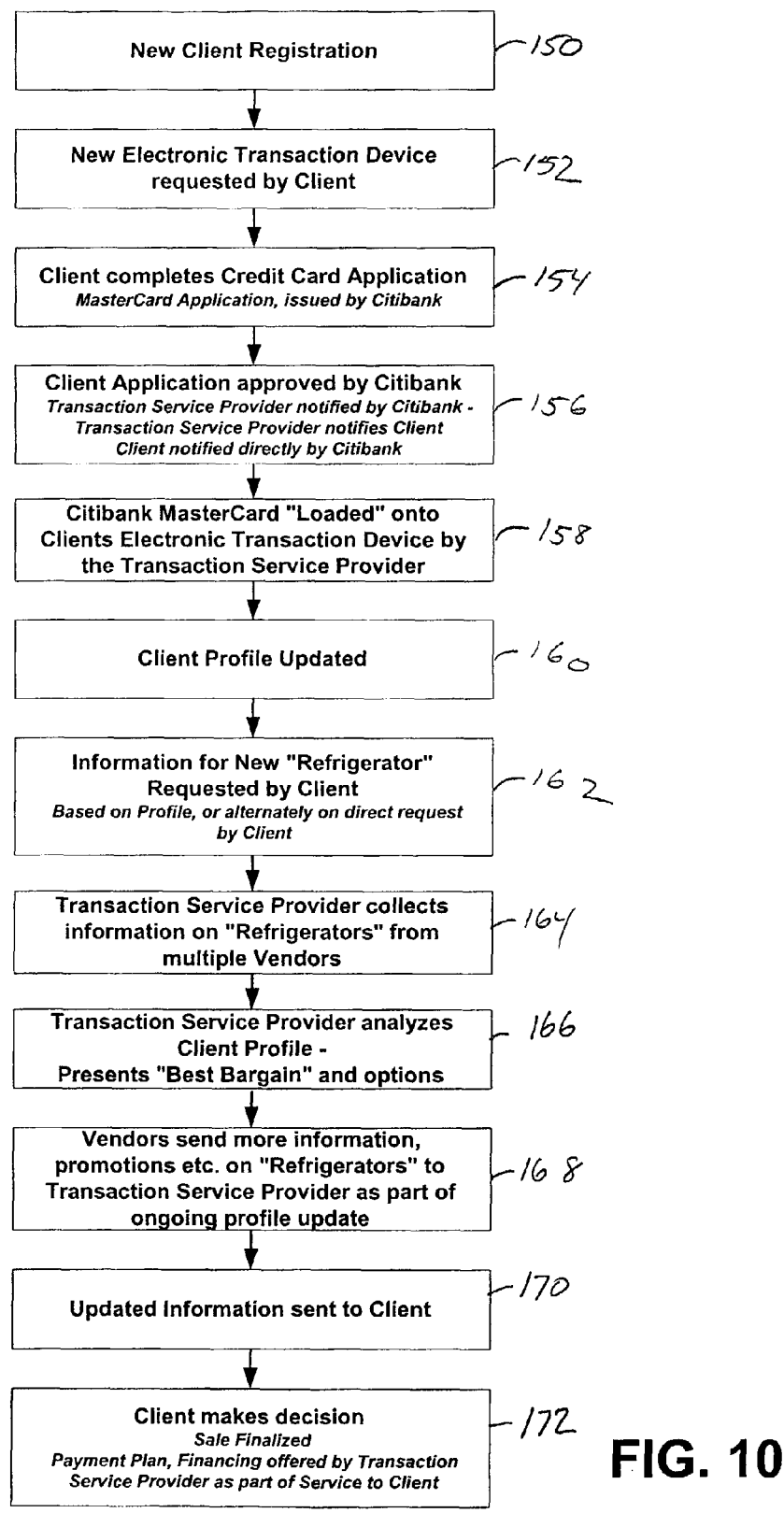
FIG. 10 is a flow chart of examples of steps conducted by a transaction service provider.

FIG. 10 outlines an example of transaction service provider service flow. The flow chart makes certain assumptions, one of which is that the client wishes to use an electronic transaction device 12 provided by the transaction service provider 10. The example also makes the assumption that the client wishes to apply for a MasterCard credit card offered by Citibank, and that the Client wishes to purchase a Refrigerator. A refrigerator is used merely as an example, the service flow would essentially remain the same for any other product or service offered by a vendor associated with the transaction service provider 10.

Referring now to FIG. 10, step 150 is new client registration with transaction service provider 10. Step 152 is new electronic transaction device 12 requested by client. Step 154 is client completes credit card application. In this example, the application is for a MasterCard, which is issued by Citibank. When client application is approved by Citibank, step 156 is transaction service provider 10, notifies client. The client may also be notified directly by Citibank.

Step 158 is Citibank MasterCard "Loaded" onto clients electronic transaction device 12 by the transaction service provider 10. Step 160 is client profile updated.

Step 162 is information for new refrigerator requested by client. The request may be based on the clients' profile, or alternately on direct request by client. Step 164 is transaction service provider 10 collects information on refrigerators from multiple vendors. Step 166 is transaction service provider 10 analyzes client profile and presents "Best Bargain" and options.

In step 168, Vendors may send additional information, promotions etc. on "Refrigerators" to the transaction service provider 10 as part of ongoing profile update. In step 170, updated information is sent to client. In step 172, the client makes decision to purchase a particular refrigerator.

Figure 11:
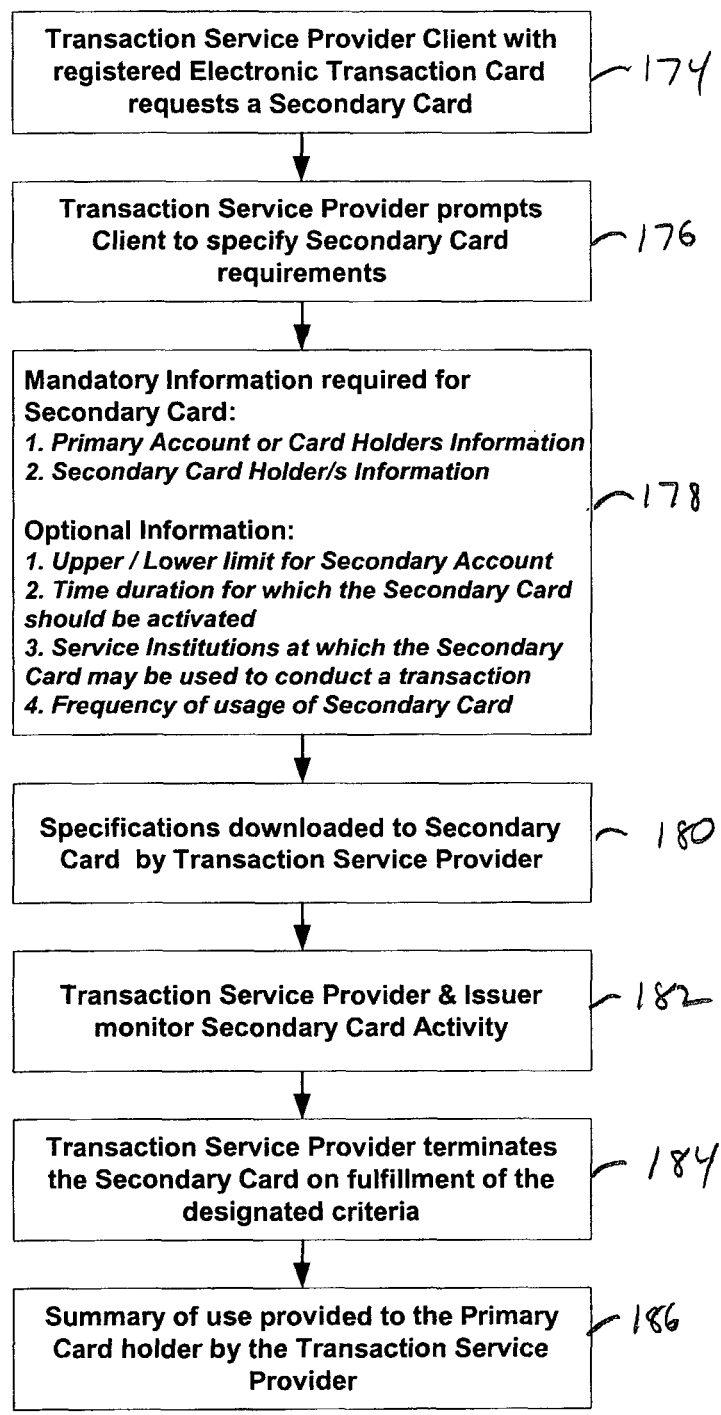
FIG. 11 is a flow chart of an example of the steps to issue a secondary card.

Referring now to FIG. 11, one example of how to issue a secondary card (sub-account) is illustrated. Step 174 is a client requests a secondary card. Typically, the client is already a user of an electronic transaction device. Step 176 is the transaction service provider 10 prompts the client to specify secondary card requirements. Step 178 indicates the information required to program the secondary card. Step 180 is transaction service provider downloads specifications to the secondary card. Step 182 is the transaction service provider and card issuer monitor the activity of the secondary card. Step 184 is a provision for the transaction service provider 10 to terminate the secondary card under certain circumstances. Step 186 is the transaction service provider provides a summary of use of the secondary card to the client.

In operation, the transaction service provider 10 may make the client's account and transactional information available to the client via known telephone and computer interfaces. Such interfaces may include interactive telephone menu and computer interface. The transaction service provider 10 may also provide a database of transactional information for a plurality of service institutions and vendors. This database enables the client to analyze transactional information across accounts from different service institutions. For example, a client may wish to review all transactions previously designated as "business expenses" or "tax deductible." The transaction service provider 10 could provide all transactions from all registered accounts, even from different service institutions.

With respect specific types of service institutions, a bank, for example, the transaction service provider 10 may keep a log of cash transactions, store and transfer money between accounts, and automatically pay bills, among other services. With respect to credit card accounts, for example, the transaction service provider 10 may update credit limit information and calculate remaining credit based on transactional information.

The transaction service provider 10 may also provide a gateway to other service institutions 18. For example, when the client's electronic transaction device 12 is coupled to the transaction service provider 10, a further coupling may be made to service institutions 18 corresponding to the client's accounts, or to vendors from which the client may wish to purchase goods or services.

Security precautions to reduce the potential for electronic transaction device 12 misuse may include the transaction service provider 10 matching a serial number of the electronic transaction device 12 with the client's social security number, or some other unique identifier, allowing service institutions 18 to reconcile account and transactional information based on the serial number of the electronic transaction device 12, compiling a list of misplaced or stolen electronic transaction devices 12, and locking or deleting personal information, account information, and/or transactional information from misplaced or stolen electronic transaction devices 12.

Promotional information may be downloaded onto the electronic transaction device 12 in several ways. For example, the transaction service provider 10 may provide a gateway to one or more service institutions 18. The transaction service provider 10 may also assemble promotional information from a plurality of service institutions and/or vendors and download the information to the electronic transaction device 12. The transaction service provider 10 may also provide promotional information to an electronic transaction device 12 independent of any service institutions. Also, vendors may download promotional information to electronic transaction devices from POS terminals 20 during a transaction.

The client may connect the electronic transaction device 12 to the transaction service provider 10. The connection may be established directly by the electronic transaction device 12, or through an interface circuit or personal computer 16.

In another example of account reconciliation, the electronic transaction device 12 transmits the transactional information to the transaction service provider 10, which in turn stores the transactional information. The transaction service provider 10 is then coupled via network 14 to each service institution 18 corresponding to an account used by the client to conduct an electronic transaction. The service institutions 18 may be coupled one at a time, in series, or simultaneously. Once coupled, the transactional information transmitted to the transaction service provider 10 is compared to the information transmitted to the service institutions 18 from the point of sale terminals 20. Any discrepancies are noted and relayed to the client and the service institutions 18.

What is claimed is:

1. A method for using an electronic transaction device with a transaction service provider, comprising:
   registering the electronic transaction device with the transaction service provider;
   registering a plurality of accounts corresponding to a plurality of service institutions;
   providing a data connection between the electronic transaction device and the transaction service provider;
   creating a database of client information including personal information, account information, and transactional information;
   storing account information for a plurality of service institutions in the database of client information;
   transferring transactional information, including a plurality of transaction records, from the registered electronic transaction device to the transaction service provider via the data connection, the transaction records comprising at least a date, a transaction total, and a vendor; and
   storing the transferred transactional information in the database of client information.

2. The method of claim 1, wherein the step of registering the electronic transaction device with the transaction service provider further comprises the steps of:
   registering a client associated with the electronic transaction device with the transaction service provider;
   collecting and storing personal information from the client in the database of client information;
   archiving a password corresponding to the client; and
   archiving the personal information stored on the electronic transaction device in the database of client information.

3. The method of claim 1, wherein the step of registering a plurality of accounts corresponding to a plurality of service institutions further comprises the steps of:
   storing account information in the database of client information;
   storing transactional information; and
   reconciling transaction records received from the electronic transaction device with transaction records received from the plurality of service institutions.

4. The method of claim 1, further comprising the steps of providing access to a database of client information to the client and analyzing transactional information in the database of client information for a plurality of accounts.

5. The method of claim 1, further comprising the steps of:
   designating a portion of the client database non-confidential;
   analyzing the portion of the client database designated as non-confidential for preferences and patterns; and
   providing analyzed transactional information to a plurality of vendors.

6. The method of claim 1, further comprising the step of downloading promotional information to the electronic transaction device from the transaction service provider.

7. The method of claim 6, wherein the step of downloading promotional information further comprises assembling promotional information from a plurality of vendors.

8. The method of claim 1, wherein the electronic transaction device is a universal electronic transaction card.

9. A method for providing promotional information to at least one client device, comprising:
   a. receiving a first plurality of transaction records from at least one service institution corresponding to a plurality of clients at a transaction service provider and receiving a second plurality of transaction records from said client device at said transaction service provider;
   b. the transaction service provider consolidating the first and second pluralities of transaction records;
   c. receiving promotional information at the transaction service provider from at least one vendor;
   d. the transaction service provider consolidating the promotional information;
   e. offering promotional information to a client based on the consolidated transaction records; and
   f. downloading the promotional information from the transaction service provider to the client device upon receipt of a request from the client wherein said client device comprises a handheld electronic transaction device.

10. The method of claim 9, wherein the step of offering promotional information to the client is performed by the transaction service provider.

11. The method of claim 9, wherein the step of offering promotional information to the client is performed by the at least one vendor.

12. The method of claim 1, further comprising:
   a. creating a plurality of client profiles at the transaction service provider, each client profile corresponding to a client and including direct client input and transaction history information;
   b. creating a plurality of vendor profiles at the transaction service provider, each vendor profile corresponding to a vendor and including direct input by the vendor;
   c. identifying at least one client to receive promotional information based on the plurality of client profiles and the plurality of vendor profiles; and
   d. delivering the promotional information to at least one client device associated with the identified client.

13. The method of claim 1, wherein at least one of the plurality of transaction records comprises an electronic receipt.

* * * * *